Oct. 3, 1950        G. EPPERLY        2,524,697
EVAPORATIVE COOLER
Filed Feb. 9, 1946
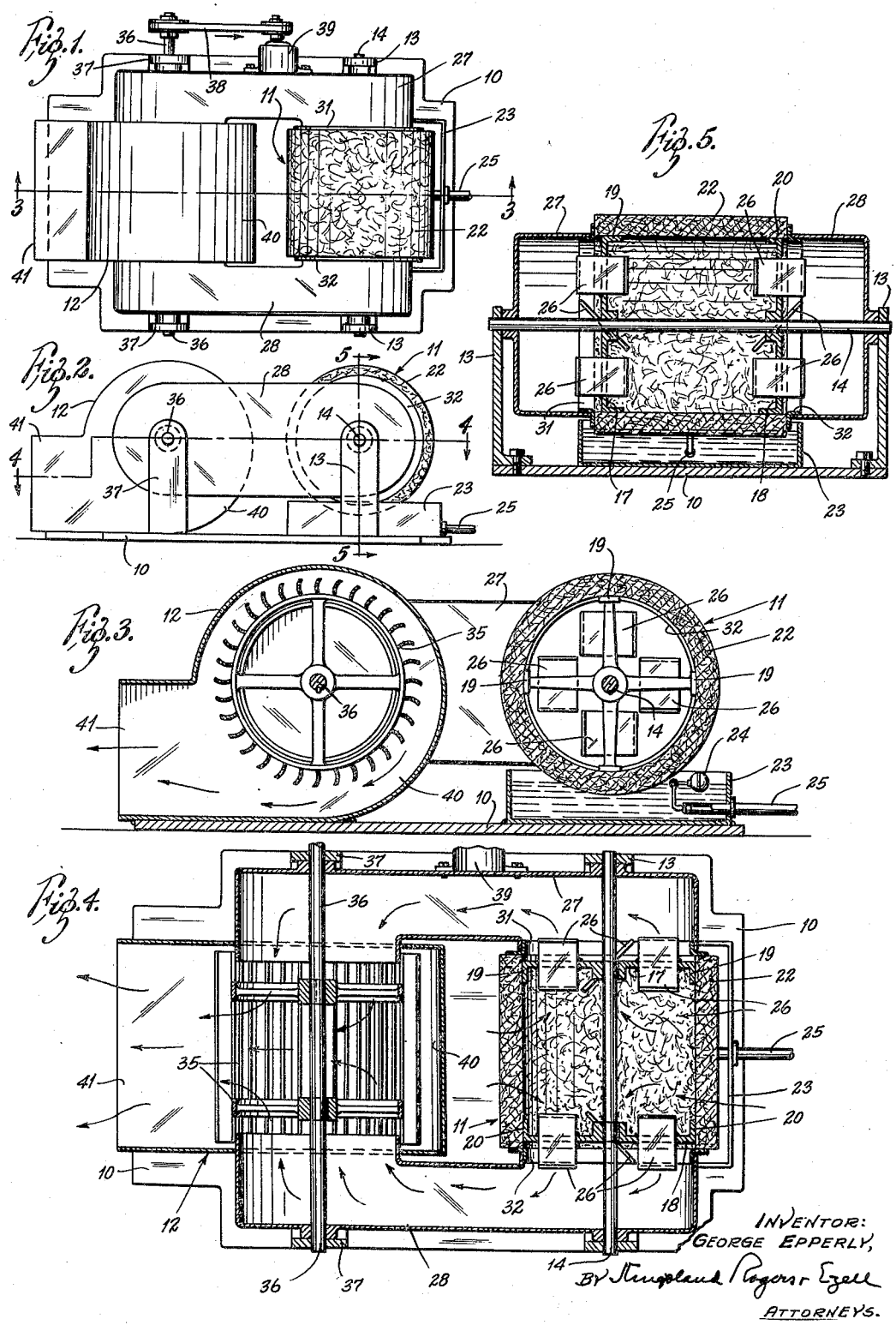
INVENTOR:
GEORGE EPPERLY,
BY Kingsland, Rogers & Ezell
ATTORNEYS.

Patented Oct. 3, 1950

2,524,697

UNITED STATES PATENT OFFICE 2,524,697

EVAPORATIVE COOLER

George Epperly, Oklahoma City, Okla.

Application February 9, 1946, Serial No. 646,563

4 Claims. (Cl. 261—92)

The present invention relates to an evaporative cooler. This cooler is of the type wherein relatively dry air, at undesirably high temperatures, is drawn through a moisture supporting body, and thereby causes evaporation of the moisture which draws latent heat vaporization from the air, and cools the air.

It is an object of the invention to provide a cooler of this type wherein the moisture holding members have the moisture evenly distributed therethrough. More specifically, it is an object of the invention to provide a cooler of this type wherein the moisture supporting member is caused to move with respect to a water source so as to prevent the channeling of water flow therethrough, and consequent uneven distribution of the moisture in the various parts of the member.

A further object of the invention is to provide a blower and a separate movable moisture supporting member. A further object of the invention is to provide a movable moisture supporting member, as aforesaid, which is caused to be moved by the force of the air drawn therethrough; although this invention is not limited to such means for operating the said member.

A further object of the invention is to provide a cooler of this type having a moisture supporting member in the form of a reel, through which the air is drawn, especially in combination with a container of water into which the reel dips in continuous rotation.

Further objects will appear from the description to follow.

In the drawings:

Fig. 1 represents a plan view of the cooler;

Fig. 2 is a side elevation thereof;

Fig. 3 is a longitudinal vertical section, taken on the line 3—3 of Fig. 1;

Fig. 4 is a horizontal longitudinal section, taken on the line 4—4 of Fig. 2; and Fig. 5 is a vertical section, taken on the line 5—5 of Fig. 2, through the moisture supporting member.

The apparatus may be mounted on a base 10. At one end of this base is disposed a moistening device 11, and at the other end is disposed a blower 12.

The moistening device 11 includes a pair of standards 13, having journals to support a shaft 14 between them. Rotatably mounted upon the shaft 14 are a pair of spiders 17 and 18. These spiders have flanges 19 and 20 at their radially outward ends. These flanges support a cylindrical pad or screen 22 formed of material that will hold moisture but which is permeable to air.

The base 10, at the bottom of the cylindrical moistening member 22, has a reservoir 3 that contains water. As shown in the drawings, the moistening member 22 dips into the water within the reservoir 23, at the lowermost part of the member. As shown in Fig. 3, water is kept at a fixed level in the reservoir 23 by a float valve 24 controlling an inflow pipe 25.

The spiders 17 and 18 support vanes 26 that are angularly disposed on the legs of the spider so as to constitute impeller blades.

Each of the ends of the cylindrical moistening member 22 is connected with a duct. These two ducts are shown at 27 and 28. Each has a cylindrical flanged outlet disposed adjacent the end of the moistening member 22. Leather seals 31 and 32 are secured to the ends of the cylindrical moistening member 22, and wipe the flanged ends of the ducts 27 and 28 to insure a tight seal at these points.

The ducts 27 and 28 have discharge outlets that open into the opposite ends of an impeller 35 of the blower 12. This impeller is mounted upon a blower shaft 36 that extends through the two ducts 27 and 28 and is supported on suitable standards 37 extending upwardly from the base. The shaft passes through one of these standards and has a belt connection 38 with a motor 39 that may be supported on the duct 27.

The impeller 35 is of the centrifugal type and is enclosed in a discharge duct 40 having a discharge outlet 41. The duct 40 is mounted upon the base 10, as by welding. The ducts 27 and 28 are supported in openings through the sides of the discharge duct 40.

Operation

When the motor 39 is started, it drives the impeller 35, so that the same draws air from the ducts 27 and 28 and discharges it from the discharge outlet 41. This causes currents of air to be drawn in through the cylindrical moistening member 22, and then axially outwardly from the middle thereof into the two ducts 27. As this air is drawn through the member 22, it evaporates moisture which is finely divided therein. This vaporization of the moisture draws heat of evaporation from the air, rendering it cooler.

In the preferred construction, these streams of air, that pass oppositely axially out of the middle of the moistening member 22, impinge upon the impeller blades 26 that are mounted upon the spiders 17 and 18. This stream of air is employed to produce relatively slow rotation of the cylindrical moistening member 22, so that it thereby successively introduces the increments of its area to the water within the reservoir 23.

Heretofore, most evaporative or adiabatic heat coolers have had water drained onto the top of the cooling member, while the latter remains stationary. This has the difficulty that the water descending by gravity through the moistening member tends to become channeled, so that there is an uneven distribution of moisture throughout the member, and consequent inefficient cooling of the air drawn through the member. In the present construction, the moistening member is caused to move and to introduce successive increments of its body to the supply of water. This eliminates the channelizing because the water evenly permeates the part of the member dipped into it, and, by the rotation of the member, evenly distributes the moisture throughout it.

As shown, the current of air is used as the power means for rotating the moistening member. As a typical example, the blower may operate at about 400 R. P. M. and the moistening member at about 2 R. P. M. It will, of course, be understood that power can be applied directly from some motive means, such as the motor 39, to the moistening member. However, the present construction is less expensive and is more desirable.

It will be obvious that changes can be made in this apparatus without departing from the principles herein contained. For example, the reel type of evaporating mechanism is preferable because it gives a maximum surface with optimum distribution of the moisture. It will be understood that other moving moistening devices can be used, although usually with less efficiency.

The apparatus may be disposed at any desired point wherein the air is to be cooled. A typical illustration of an installation would be one wherein the apparatus is disposed in the open air, and the discharge outlet 41 is located through a window or partition or wall to discharge cooled air into an enclosed space.

What is claimed is:

1. In an evaporative cooler, a base, a shaft supported thereon, a cylindrical moistening member on the shaft, open at its ends, a blower having central inlets, a pair of ducts connected axially with the moistening member and with the blower, said ducts having first cylindrical ends located adjacent the ends of the cylindrical moistening member, and having second ends connected into the inlets of the blower, a reservoir below the cylindrical moistening member, into which the lower part dips during rotation of said member, and means to rotate the moistening member.

2. In an evaporative cooler, a base, a shaft supported thereon, a cylindrical moistening member on the shaft, open at its ends, a blower having central inlets, a pair of ducts connected axially with the moistening member and with the blower, said ducts having first cylindrical ends located adjacent the ends of the cylindrical moistening member, and having second ends connected into the inlets of the blower, a reservoir below the cylindrical moistening member, into which the lower part dips during rotation of said member, means to rotate the moistening member, and sealing means between the rotating moistening member and the first ends of the ducts.

3. In an evaporative cooler, a base, support means rising from the base, a horizontal shaft on the support means, an open-ended, cylindrical, air-permeable moistening member on the shaft for rotation relatively to the base, a blower on the base, having opposite axial inlets disposed on a line parallel to the shaft, and having an outlet, a pair of conduits, one connecting each open end of the cylindrical moistening member with the corresponding inlet to the blower, whereby the blower may draw air inward through the permeable moistening means, and outward from its ends into the inlets of the blower, a moisture reservoir on the base below the moistening member and into which the lower part of the said member extends, and means to rotate the moistening member.

4. In an evaporative cooler, a base, support means rising from the base, a horizontal shaft on the support means, an open-ended, cylindrical, air-permeable moistening member on the shaft for rotation relatively to the base, a blower on the base, having opposite axial inlets disposed on a line parallel to the shaft, and having an outlet, a pair of conduits, one connecting each open end of the cylindrical moistening member with the corresponding inlet to the blower, whereby the blower may draw air inward through the permeable moistening means, and outward from its ends into the inlets of the blower, a moisture reservoir on the base below the moistening member and into which the lower part of the said member extends, and means to rotate the moistening member, comprising vanes thereon at the ends thereof where the conduits are disposed, said vanes being angular relative to the air flow.

GEO. EPPERLY.

REFERENCES CITED

The following references are of record in the file of this patent:

UNITED STATES PATENTS

| Number | Name | Date |
|---|---|---|
| 2,157,974 | Wentz | May 9, 1939 |
| 2,287,147 | Stratton | June 23, 1942 |
| 2,300,580 | Loprich | Nov. 3, 1942 |
| 2,417,010 | Mobley | Mar. 4, 1947 |